United States Patent
Grell et al.

(10) Patent No.: US 7,801,987 B2
(45) Date of Patent: Sep. 21, 2010

(54) DYNAMIC INFRASTRUCTURE FOR MONITORING SERVICE LEVEL AGREEMENTS

(75) Inventors: Stephan Grell, Herzogenrath (DE); Olivier Nano, Aachen (DE)

(73) Assignee: Microsoft Corporation, Redmond, WA (US)

( * ) Notice: Subject to any disclaimer, the term of this patent is extended or adjusted under 35 U.S.C. 154(b) by 297 days.

(21) Appl. No.: 12/145,995

(22) Filed: Jun. 25, 2008

(65) Prior Publication Data

US 2009/0327476 A1   Dec. 31, 2009

(51) Int. Cl.
*G06F 15/173* (2006.01)
(52) U.S. Cl. ............. 709/224; 709/223; 705/7; 705/35; 370/235
(58) Field of Classification Search ......... 709/217–228; 705/7, 35; 370/225
See application file for complete search history.

(56) References Cited

U.S. PATENT DOCUMENTS

| | | | |
|---|---|---|---|
| 6,925,493 | B1 | 8/2005 | Barkan et al. |
| 7,007,082 | B2 | 2/2006 | Harasawa |
| 7,082,463 | B1 | 7/2006 | Bradley et al. |
| 7,313,533 | B2 | 12/2007 | Chang et al. |
| 2003/0225549 | A1* | 12/2003 | Shay et al. ............ 702/182 |
| 2003/0236882 | A1 | 12/2003 | Yan et al. |
| 2005/0188075 | A1 | 8/2005 | Dias et al. |
| 2006/0047802 | A1 | 3/2006 | Iszlai et al. |
| 2007/0180061 | A1 | 8/2007 | Bantz et al. |

OTHER PUBLICATIONS

A Service Level Agreement Language for Dynamic Electronic Services, by Heiko Ludwig, Alexander Keller, Asit Dan and Richard King, Electronic Commerce Research, 3: 43-59 (2003).*
Monitoring Middleware for Service Level Agreements in Heterogeneou Environments; Graham Morgan, Simon Parkin, Carlos Molina-Jimenez and James Skene; vol. 189/2005 pp. 79-93.*
"Actional", Progress Software Corporation, 1993-2008, pp. 2.
"Amberpoint Comprehensive Runtime SOA Governance Solutions Visibility and control at every stage of the SOA lifecycle", Amberpoint, Inc, 2008, pp. 2.
Andrieux, et al., "Web Services Agreement Specification" Open Grid Forum (2004-2007), pp. 81.
Baresi, et al., "Smart Monitors for Composed Services", ACM, 2004, pp. 10.
Ludwig, et al., "Cremona: An Architecture and Library for Creation and Monitoring of WS-Agreements", ACM, 2004, pp. 10.

(Continued)

*Primary Examiner*—Wing F Chan
*Assistant Examiner*—Hitesh Patel
(74) *Attorney, Agent, or Firm*—Lee & Hayes, PLLC

(57) ABSTRACT

A dynamic infrastructure for monitoring service level agreements (SLAs) is described. In an embodiment, the infrastructure comprises three types of functional elements: probes, metrics and audits and a small number of primitive actions for manipulating these elements. The elements are connected by streams which store data for processing and transport data between functional elements. The primitive actions, which are duplicating and removing functional elements as well as splitting and joining metrics, are arranged such that the functional elements can be optimized dynamically in responses to changes in the service and/or the hardware without losing any data.

15 Claims, 20 Drawing Sheets

OTHER PUBLICATIONS

Dan, et al., "Web Services on Demand: WSLA-Driven Automated Management", IBM System Journal, vol. 43, No. 1, 2004, pp. 136-158.

"Dynamic Systems Initiative", Microsoft Corporation, 2008, pp. 2. Event Services, <<http://team/sites/ecs/default.aspx>>, pp. 2.

Keller, et al., "Defining and Monitoring Service Level Agreements for Dynamic e-Business", Proceeedings of the 16th System Administration Conference (LISA 2002), The USENIX Association, Philadelphia, PA, USA, 2002, pp. 16.

Keller, et al., "The WSLA Framework: Specifying and Monitoring Service Level Agreements for Web Services", IBM Research Division, 2002, pp. 22.

Ludwig, et al.,"WSLA Language Specification Version 1.0", IBM Corporation,(2001-2003), pp. 110.

Ludwing, et al., "A Service Level Agreement Language for Dynamic Electronic Services", IEEE, 2002, pp. 8.

Nano, et al., "Filling the Gap between SLA and Monitoring". Published at Echallenges 2006 and in 2006 version of Innovation and the Knowledge: Economy, Issues, Applicartions, Case Studies (IOS Press 2005).

Nano et al., "SLA Monitoring: Shifting the Trust". Published in Innovation and the Knowledge: Issues, Applications, Case Studies. IOS Press 2005.

"NextGRID: Architecture for Next Generation Grids", <<http://www.nextgrid.org>>, pp. 1.

"Nimsoft Acquires Indicative Software", Retrieved on Apr. 17, 2008, pp. 1.

"Oblicore The Leader for Service Level Management", Retrieved on Apr. 17, 2008 <<http://www.oblicore.com>>, pp. 1.

Padgett, et al., "Grid Service Level Agreements Combining Resource Reservation and Predictive Run-Time Adaptation", School of Computing, University of Leeds, pp. 8.

Saraiya, "Composition Framework", Retrieved on Apr. 17, 2008, <<http://composition/default.aspx>>, p. 1.

"Service Modeling Language", Retrieved on Apr. 17, 2008, <<http://www.serviceml.org>>p. 1.

U.S. Appl. No. 11/244,718.

"Web Service Level Agreements (WSLA) Project" retrieved on Apr. 17, 2008, <<http://www.research.ibm.com/wsla>>, p. 1.

"WS Team", retrieved on Apr. 17, 2008, <<http://emic-srv-2/WSTeam>>, p. 1.

* cited by examiner

DYNAMIC INFRASTRUCTURE FOR MONITORING SERVICE LEVEL AGREEMENTS

BACKGROUND

The number of electronic services which are offered by service providers to customers has grown enormously. These electronic services include communication services (e.g. email), information services (e.g. providing news, legal information, financial information etc) and media services (e.g. providing videos, music etc). Service Oriented Architectures (SOAs) are typically used to provide these services and SOAs use distributed systems and collections of loosely coupled services to provide the required functionality in a manner which improves flexibility and adaptability.

When a customer subscribes to a service, the agreement between the parties is generally described in a service contract and one aspect of this contract is a service level agreement (SLA). An SLA describes what the service offers and under which conditions the service is offered, such as the price and includes an expected quality of the service. Problems may arise where the SLA is ambiguous and therefore SLA languages have been developed which are intended to remove ambiguities about what guarantees are provided and how data is collected and analyzed to confirm whether the guarantees are being met. Failing to meet guarantees can have serious consequences which may include financial penalties and therefore it is important that the services are monitored correctly and accurately against the relevant SLA.

The embodiments described below are not limited to implementations which solve any or all of the disadvantages of known SLA infrastructures and SLA languages.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A dynamic infrastructure for monitoring service level agreements (SLAs) is described. In an embodiment, the infrastructure comprises three types of functional elements: probes, metrics and audits and a small number of primitive actions for manipulating these elements. The elements are connected by streams which store data for processing and transport data between functional elements. The primitive actions, which are duplicating and removing functional elements as well as splitting and joining metrics, are arranged such that the functional elements can be optimized dynamically in responses to changes in the service and/or the hardware without losing any data.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
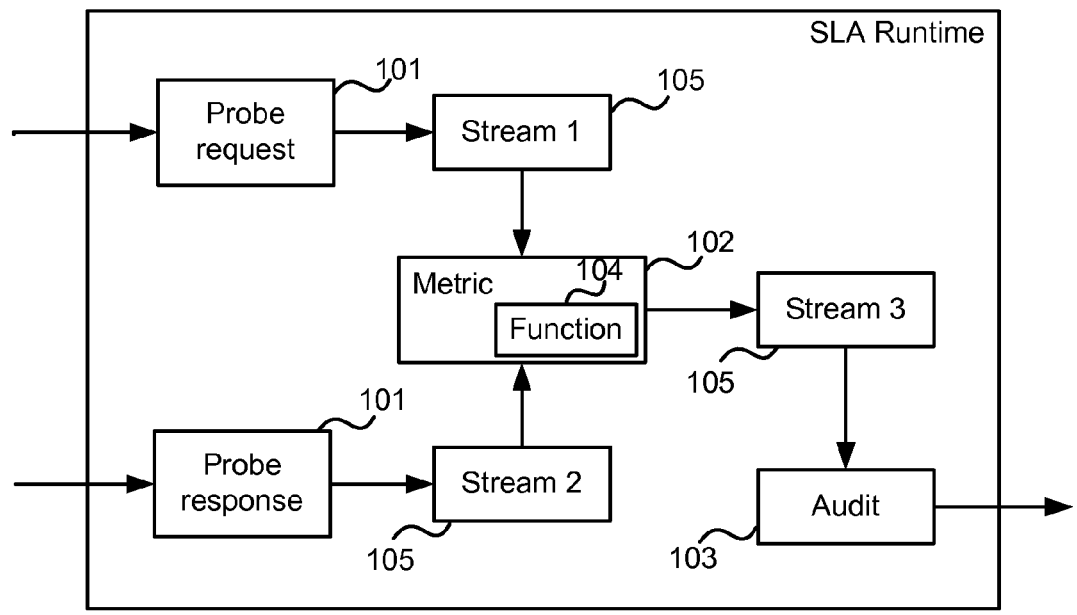
FIG. 1 is a schematic diagram of an SLA runtime.

FIG. 1 is a schematic diagram of an SLA runtime which comprises a number of different functional elements. Through use of these functional elements and a set of primitive actions on the elements, SLAs can be flexibly deployed at runtime and an SLA deployment can be optimized at any given time without losing any data. These functional elements and primitive actions form a dynamic infrastructure for monitoring SLAs.

The dynamic infrastructure for monitoring SLAs described herein provides a flexible and efficient architecture for monitoring services deployed in a dynamic environment under SLAs. The environment is dynamic because service providers may need to introduce new machines to cope with growth in a service or distribute SLA processing to perform load balancing of SLA runtimes.

In an example scenario, a service with growing demands and an SLA may be a hosted version of a Microsoft Exchange Server, which allows companies to host Microsoft Exchange Servers for customers. The customers will sign an agreement containing the number of users/mail boxes and the expected service level. The load of the Microsoft Exchange Server depends on:

The number of users

The number of emails per day

The number of update requests by the email client

The mail box size

The message size

Every exchange server manages a set of mail accounts. Since every exchange server is completely independent, the SLA infrastructure has to have probes on every server to get accurate information required for monitoring the SLA. For example, if the SLA includes a performance guarantee relating to response times, the infrastructure needs to intercept the requests and responses to calculate the time spent in processing and responding to each request. The interceptions are best done on the machine that runs Exchange.

When a new Microsoft Exchange Server is brought into the pool of Microsoft Exchange Servers, the SLA monitoring systems needs to start monitoring the new Microsoft Exchange Server. To update the SLA monitoring runtimes, the administrator will start up a new SLA monitoring runtime on the Microsoft Exchange Server and update the deployment files for the affected SLAs. Using the dynamic infrastructure described herein, the SLA monitoring infrastructure will execute the required changes without stopping the monitoring or missing data.

The functional elements shown in FIG. 1 comprise: probes 101, metrics 102 and audits 103. Probes 101 extract data and a probe can send data to metrics and audits. Depending on the SLAs, probes can come in sets (e.g. a request probe and a response probe, as shown in FIG. 1). A metric 102 filters, aggregates and transforms data and can send data to other metrics and audits. Functions 104 define data transformation actions used in metrics 102 and a metric contains a stack of one or more functions. Where the stack comprises more than one function, the input to one function is the output of another function. An audit 103 validates data to ensure that it is within a defined range and is a data-sinc. A stream 105 transports data between the elements and stores the data for processing. A stream is an abstraction of data stored in memory, where the memory may be of any type and in any location (e.g. on a single machine, spanned across several machines, etc). There is a defined order to data in a stream and the data can be accessed in sequence. In some examples, a stream may be immutable, e.g. where data is read from one or more streams by a metric and new data is generated by the metric, the new data is written to a new stream and not one of the input streams.

Whilst the terms 'probe', 'metric' and 'audit' are used herein, in other examples different terminology may be used to denote elements and/or the three functional layers which are implemented by these elements: measurement, computation and violation detection.

The instantiation of an SLA using these elements is very modular and due to the concept of streams between the elements, two elements talking to each other do not have to reside in the same runtime. A stream can forward the data to any element in any runtime as long as it is reachable through a network. The processing in metrics and audits can be disabled without affecting the streams, because probes, metrics and audits are stateless and the data is stored in the streams. The streams will continue to store the data until the metric or audit is enabled again.

The three types of functional elements may be used in describing SLAs. By using this syntax and any constraints associated with the elements, the monitoring that is needed for a particular SLA can be automatically generated.

To enable flexible deployment of SLAs at runtime, a set of primitive actions are defined:

Duplicate a probe/metric/audit element

Remove a probe/metric/audit element

Split/Join a metric element

These actions are defined such that the semantic of the SLA is not changed. These primitive actions can be combined to move an element (probe/metric/audit) or to move a processing path (which comprises a combination of elements and streams). Through use of these primitive actions, an SLA deployment can be optimized at any time without losing any data, e.g. to perform load balancing between machines or to reduce network traffic. These actions are described in more detail below, and for the purposes of the following description the term 'input element' is used to refer to the probe or metric that sends data to the element that is being modified and the term 'output element' is used to refer to the metric or audit that receives data from the element that is being modified.

Figure 2:
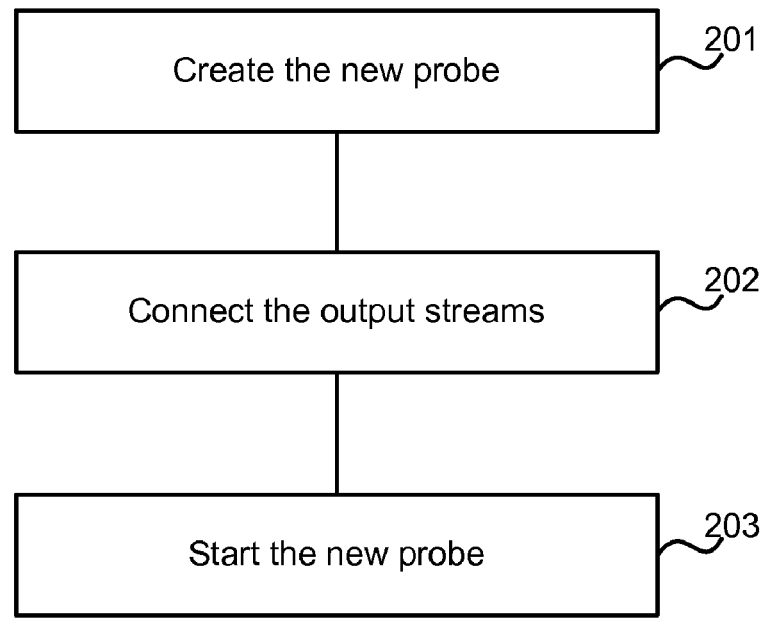
FIG. 2 is a flow diagram of an example method of duplicating a probe.
Figure 3:
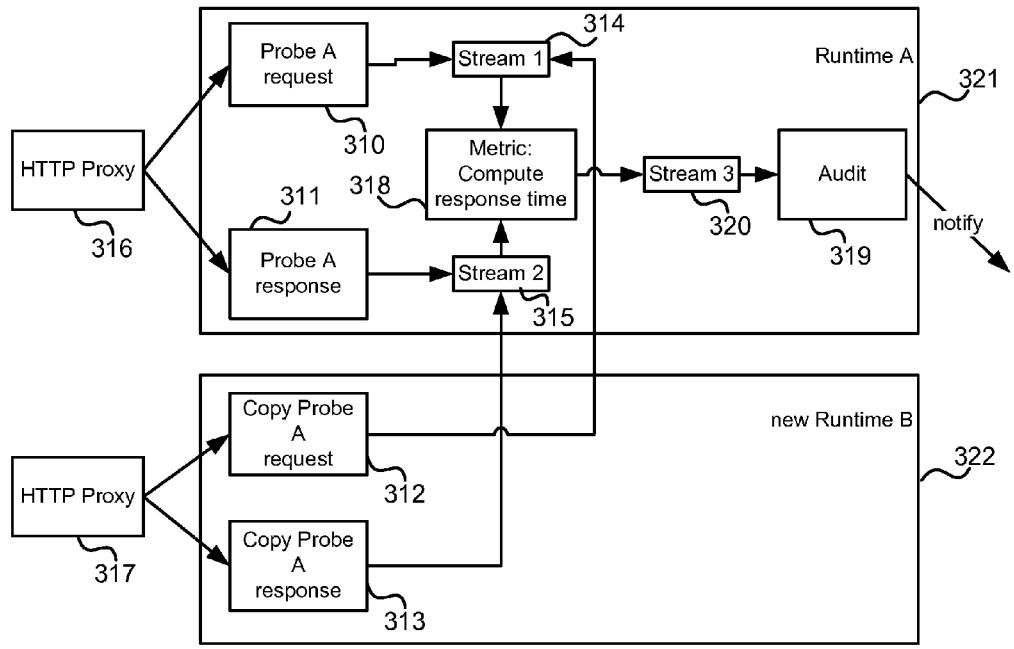
FIG. 3 shows a schematic diagram depicting duplication of a probe.

As probes can come in sets, if a primitive action moves, duplicates or removes a probe, a check is performed to determine whether the probe is part of a set and then the action is performed on the set. Probes are defined as belonging to a set where a metric uses data from each of the probes in computing a function, e.g. as shown in FIG. 3, metric 318 requires data from both probes 310, 311 in order to compute a response time and therefore the probes 310, 311 constitute a set of probes. FIG. 2 is a flow diagram of an example method of duplicating a probe and a schematic diagram depicting duplication of a probe is shown in FIG. 3.

The duplication of a probe is needed when a new data source for a SLA is created (e.g. a new instance of a Microsoft Exchange Server which needs to be monitored under an SLA). A probe is duplicated by creating the new probe (block 201), connecting the output streams (block 202) and then starting the new probe (block 203). In FIG. 3, the original probe is one of a pair of probes 310, 311 and therefore two new probes 312, 313 are created (in block 201) and connected to the two streams 314, 315 (in block 202). In the example shown in FIG. 3, each probe extracts data from a HTTP proxy 316, 317 and the function that the metric 318 performs is to compute the response time (e.g. to a web query). The audit element 319 compares the computed values (stored in stream 3 320) to defined values (e.g. a defined range) and notifies the service provider in defined circumstances, e.g. if the computed values fall outside the defined range or exceed a defined value.

Figure 5:
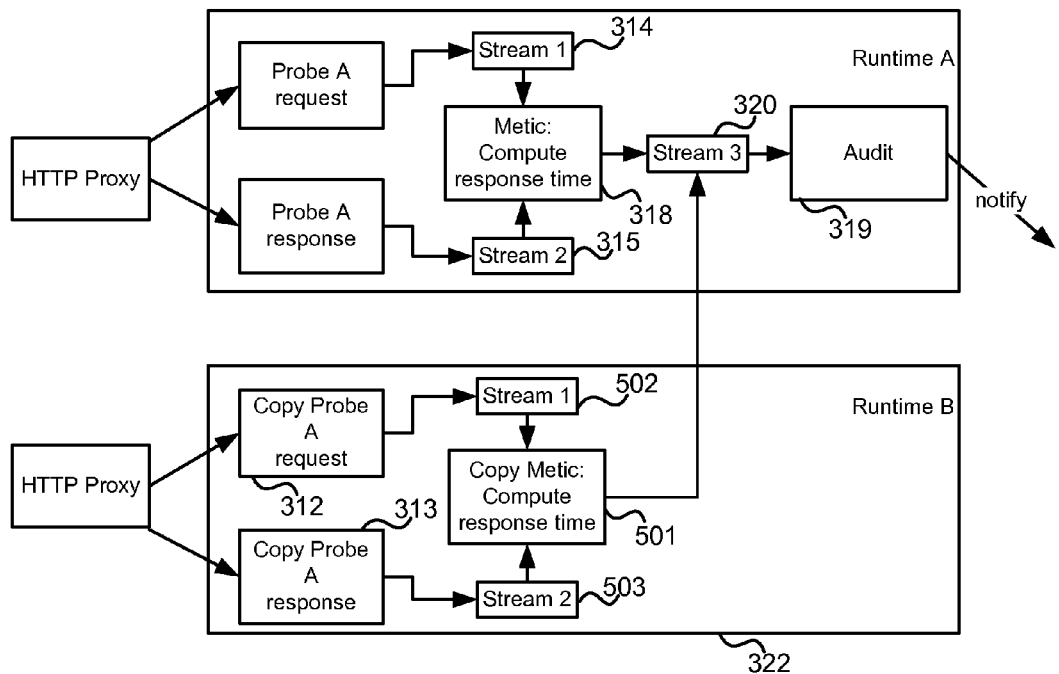
FIG. 5 shows a schematic diagram depicting duplication of a metric.

A metric may be duplicated to limit the amount of data sent between SLA runtimes or to share the load between SLA runtimes. The duplication of a metric can only occur in certain situations. In particular, duplication may occur if the metric's input stream(s) have multiple sources from different SLA runtimes and the function executed by the metric is not an aggregation functions, such as average or count. Furthermore, if a metric has more than one input stream (e.g. metric 318 in FIG. 3 has two input streams 314, 315), then each new metric created by duplication needs to have the same number of input streams (and data sources) coming from the same set of SLA runtimes (e.g. in FIG. 3, a duplicated metric would need to have two input streams and consume two probes from within the set of SLA runtimes 321, 322). Additionally there cannot be more instances of one metric than there are inputs to the same stream, e.g. if there are two inputs to a stream (e.g.

probes 310 and 312 into stream 1 314 in FIG. 3), there cannot be more than two instances of the metric (e.g. metric 318 in FIG. 3 and metric 501 in FIG. 5). Otherwise, the metric will not have sufficient data to perform the required function.

Figure 4:
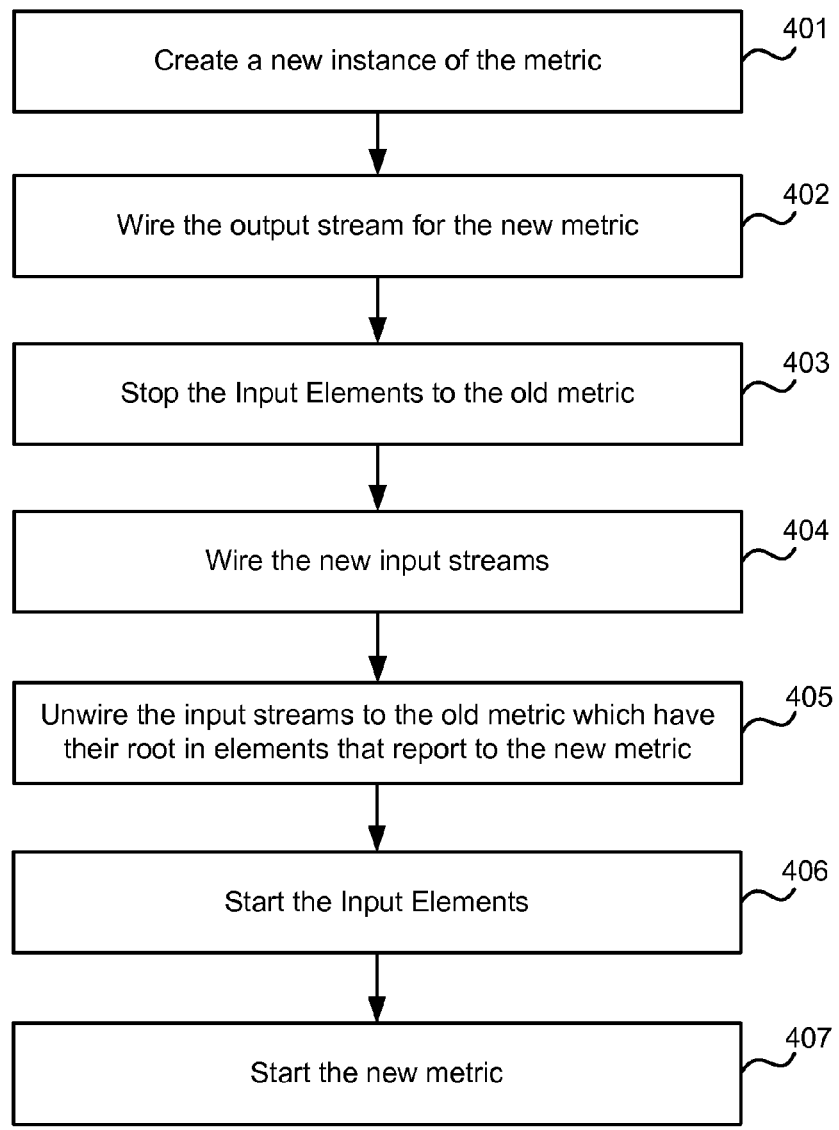
FIG. 4 shows a flow diagram of an example method of duplicating a metric.

FIG. 4 shows a flow diagram of an example method of duplicating a metric and this can be described with reference to the schematic diagram shown in FIG. 5. The execution steps comprise: creating a new instance of the metric 501 (block 401) and connecting the output stream 320 for the new metric (block 402). The input elements 312, 313 to the old metric 308 are stopped (block 403) and the new input streams 502, 503 connected (block 404) before disconnecting the input streams 314, 315 to the old metric 318 which have their root in elements 312, 313 that report to the new metric (block 405). Once the input and output streams have been correctly connected (in blocks 402, 404-405), the input elements 312, 313 are started (block 406) and the new metric 501 is started (block 407).

Figure 6:
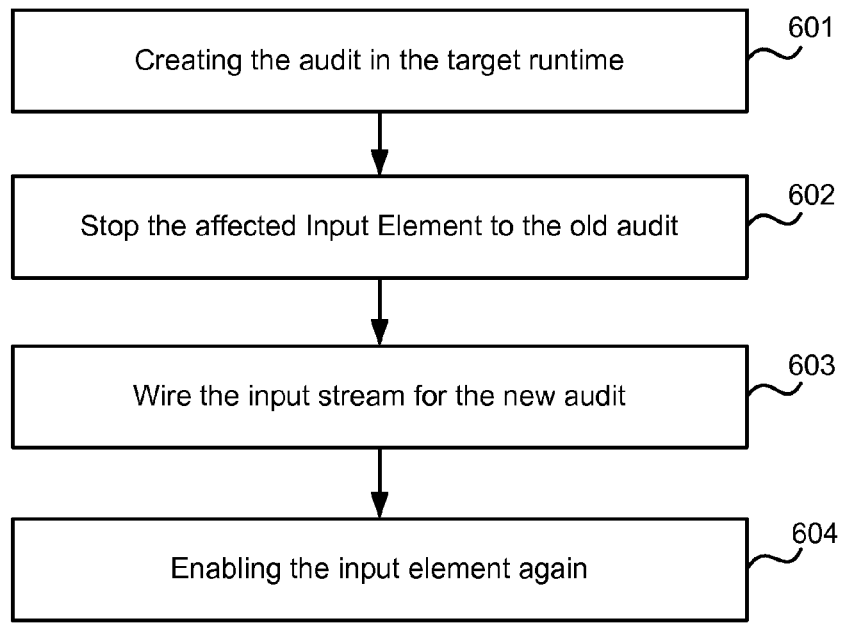
FIG. 6 shows a flow diagram of an example method of duplicating an audit.

Duplicating an audit may be performed when the stream to the audit has multiple inputs from different runtimes (e.g. as shown in FIG. 5). In such a situation, an audit may be duplicated to prevent (or reduce) data moving between runtimes or to share the load between runtimes. FIG. 6 shows a flow diagram of an example method of duplicating an audit and this can be described with reference to the schematic diagram shown in FIG. 7. The method comprises creating the audit 701 in the target runtime 322 (block 601) and stopping the affected Input Element 501 to the old audit 319 (block 602). The input stream 702 for the new audit 701 is connected (block 603) before enabling the input element 501 again (block 604).

Figure 7:
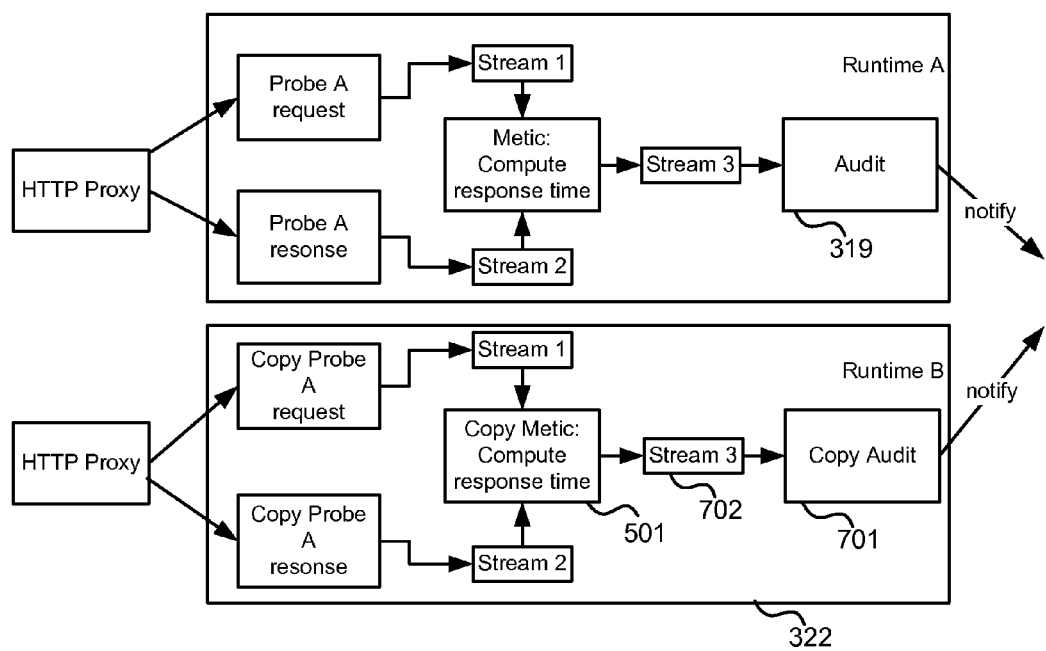
FIG. 7 shows a schematic diagram depicting duplication of an audit.

In an example implementation, proxy elements may be used where data is exchanged between runtimes. These proxy elements are instanciated for the receiving element (e.g. for receiving audit 319 in FIG. 5) and sit in the runtime that sends the data to the element (e.g. runtime B 322 in FIG. 5). The proxy element forwards the data between runtimes and in order to achieve this, the proxy knows the transport protocol and how the real element (e.g. audit 319) is reached. If the receiving element is then duplicated (e.g. as shown in FIGS. 6 and 7), the proxy element is removed (e.g. as part of block 603).

The above description describes how probes, metrics and audits can be duplicated, i.e. to create a new probe/metric/audit. In the reverse circumstances, where an element already has a duplicate, an element can be removed. Removal of elements may be implemented, for example, where a service provider reduces the amount of hardware (e.g. servers) used to provide a service.

Figure 8:
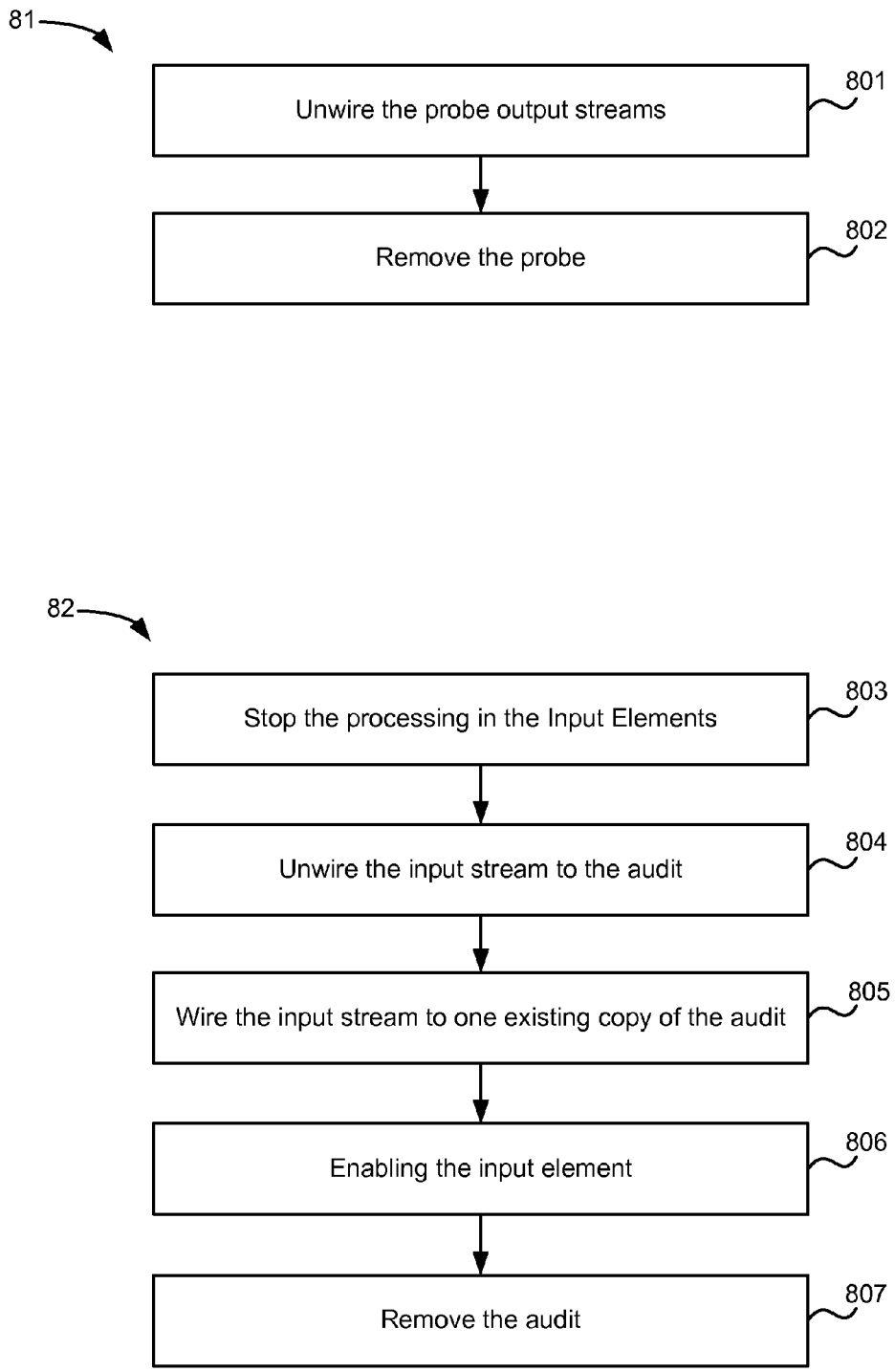
FIGS. 8 and 9 show flow diagrams of example methods of removing a probe, a metric and an audit.
Figure 9:
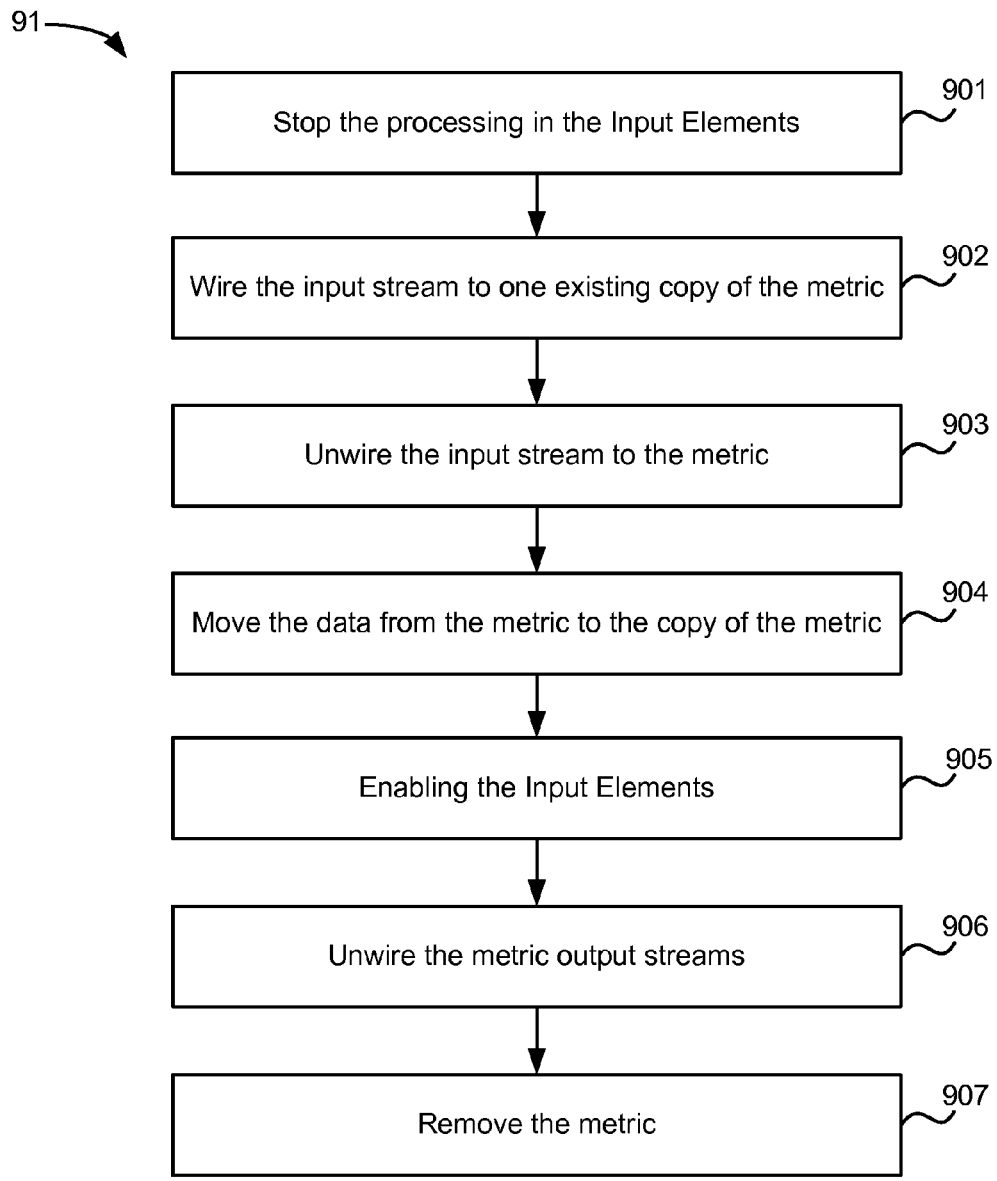

FIGS. 8 and 9 show flow diagrams 81, 91, 82 of example methods of removing a probe, a metric and an audit respectively. As shown in FIG. 8 (flow diagram 81) any duplication of a probe can be removed by disconnecting the probe output streams (block 801 e.g. disconnecting the probes 312, 313 from streams 314, 315 in FIG. 3) and removing the probe (block 802) or set of probes (e.g. probes 312, 313 in FIG. 3). A metric with at least one duplicate can be removed by stopping the processing in the input elements (block 901 in FIG. 9), connecting the input stream to one existing copy of the metric (block 902) and disconnecting the input stream to the metric (block 903). Data from the metric (i.e. the data stored in the input stream of the metric) is then moved to the copy of the metric (block 904) before enabling the input elements (block 905), disconnecting the metric output streams (block 906) and removing the metric (block 907). In a similar manner to metrics, an audit can only be removed it if has at least one duplicate. To remove the audit (as shown in FIG. 8 flow diagram 82), the processing in the input elements (e.g. metric 501 in FIG. 7) is stopped (block 803) and the input stream (e.g. stream 3 702 in FIG. 7) to the audit is disconnected (block 804). The input stream is then connected to one existing copy of the audit (block 805, e.g. as shown in FIG. 5) before the input elements are enabled (block 806). The audit (e.g. audit 701 in FIG. 7) can then be removed (block 807).

Moving elements can be achieved through a combination of duplication and removal of the original element. A probe is stateless and moving it means that it is extracting data from a new data source. Therefore the moving of a probe is straight forward. It is a combination of first duplicating it (e.g. as shown in FIG. 2) and then removing the old probe (as shown in FIG. 8, flow diagram 81).

Figure 10:
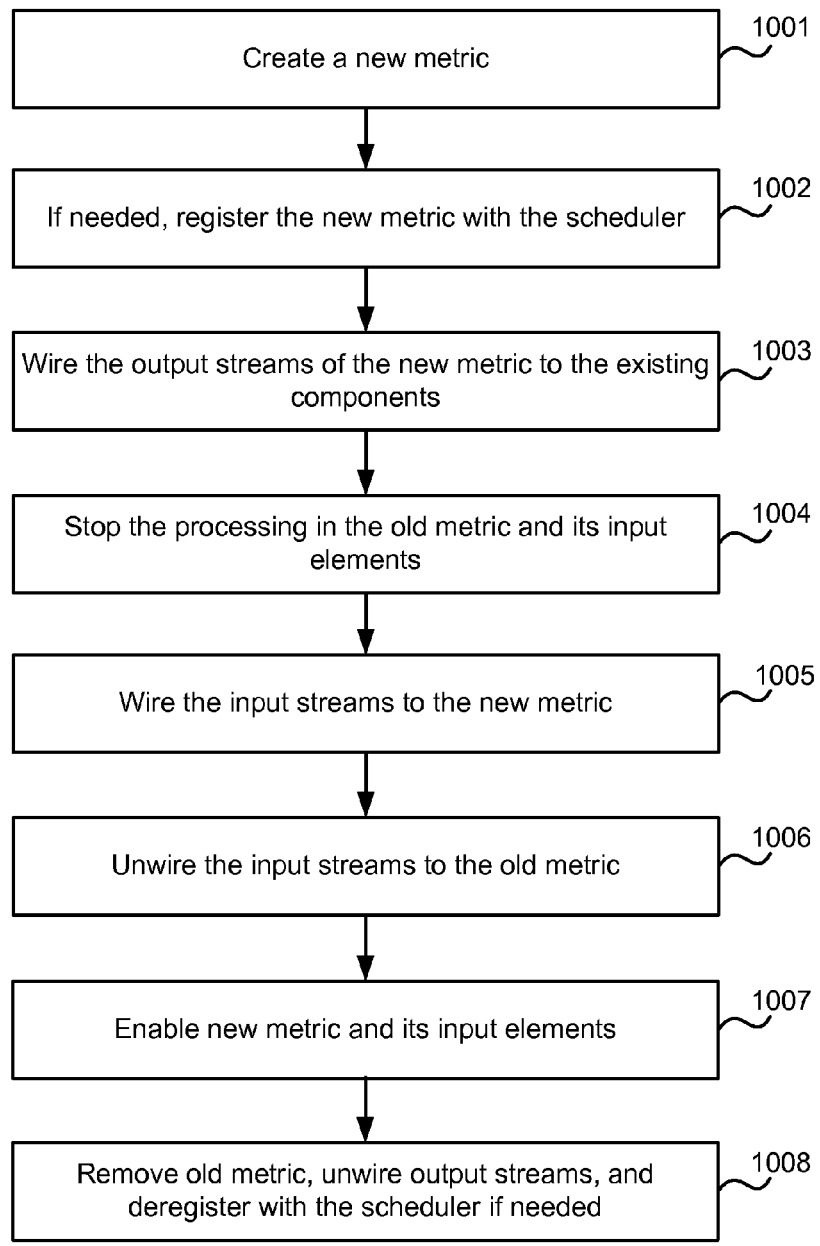
FIG. 10 shows a flow diagram of an example method of moving a metric.
Figure 11:
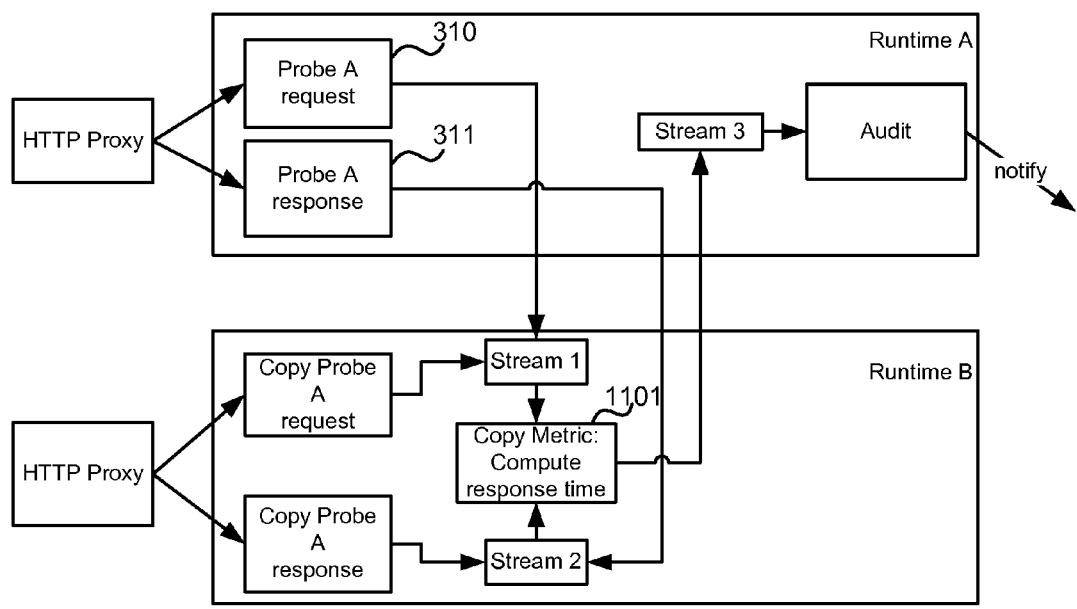
FIG. 11 shows a schematic diagram depicting moving of a metric.

A flow diagram of an example method of moving a metric is shown in FIG. 10 and can be described with reference to the schematic diagram in FIG. 11. As shown in FIGS. 10 and 11, a new metric 1101 is created (block 1001, 1003, e.g. as shown in FIG. 4 in more detail) and if necessary the new metric is registered with a scheduler (block 1002). It may be necessary to register the new metric if there is a time controlled aspect to the metric's actions. Such time controlled actions are triggered by the scheduler. The processing in the old metric and the input elements is then stopped (block 1004) and the input streams (from probes 310, 311) are connected to the new metric (block 1005) and disconnected from the old metric (block 1006) before the new metric and the input elements are enabled (block 1007). The old metric can then be removed, its output streams disconnected and it can be deregistered with the scheduler if required (block 1008). Deregistration may only be required if the metric has previously be registered with a scheduler.

Figure 12:
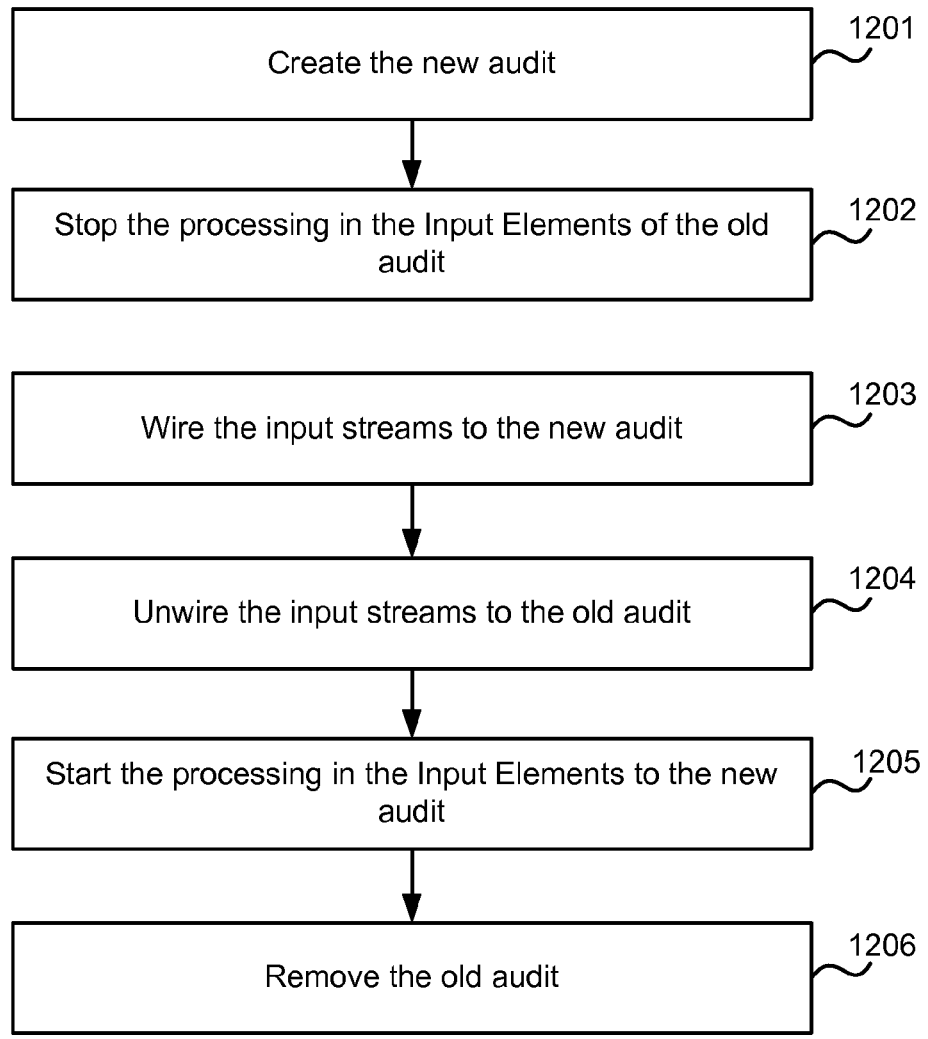
FIG. 12 shows a flow diagram of an example method of moving an audit.
Figure 13:
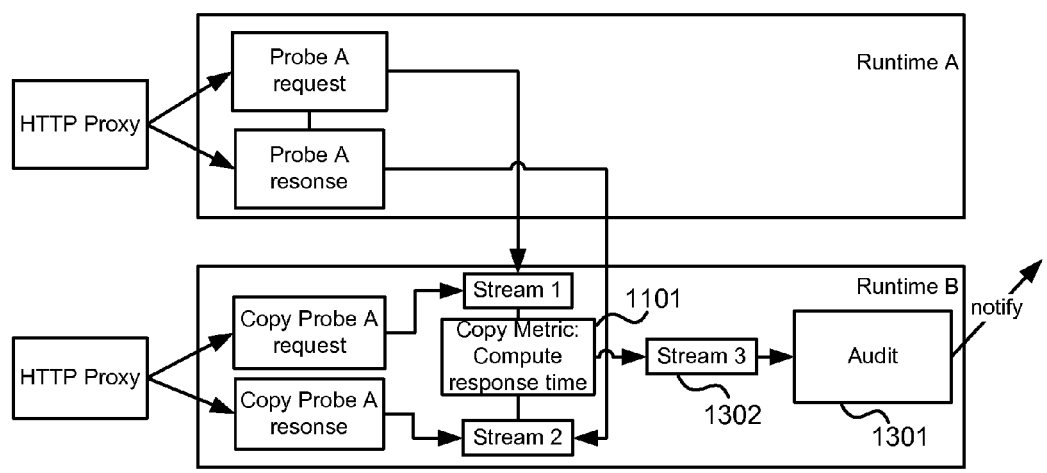
FIG. 13 shows a schematic diagram depicting moving of an audit.

A flow diagram of an example method of moving an audit is shown in FIG. 12 and can be described with reference to the schematic diagram in FIG. 13. The new audit 1301 is created (block 1201) and the processing in the input elements 1101 of the old audit is stopped (block 1202). The input streams 1302 to the new audit are connected (block 1203) and the input streams to the old audit are connected (block 1204) before starting the processing in the input elements 1101 to the new audit 1301 (block 1205). The old audit is then removed (block 1206).

Figure 14:
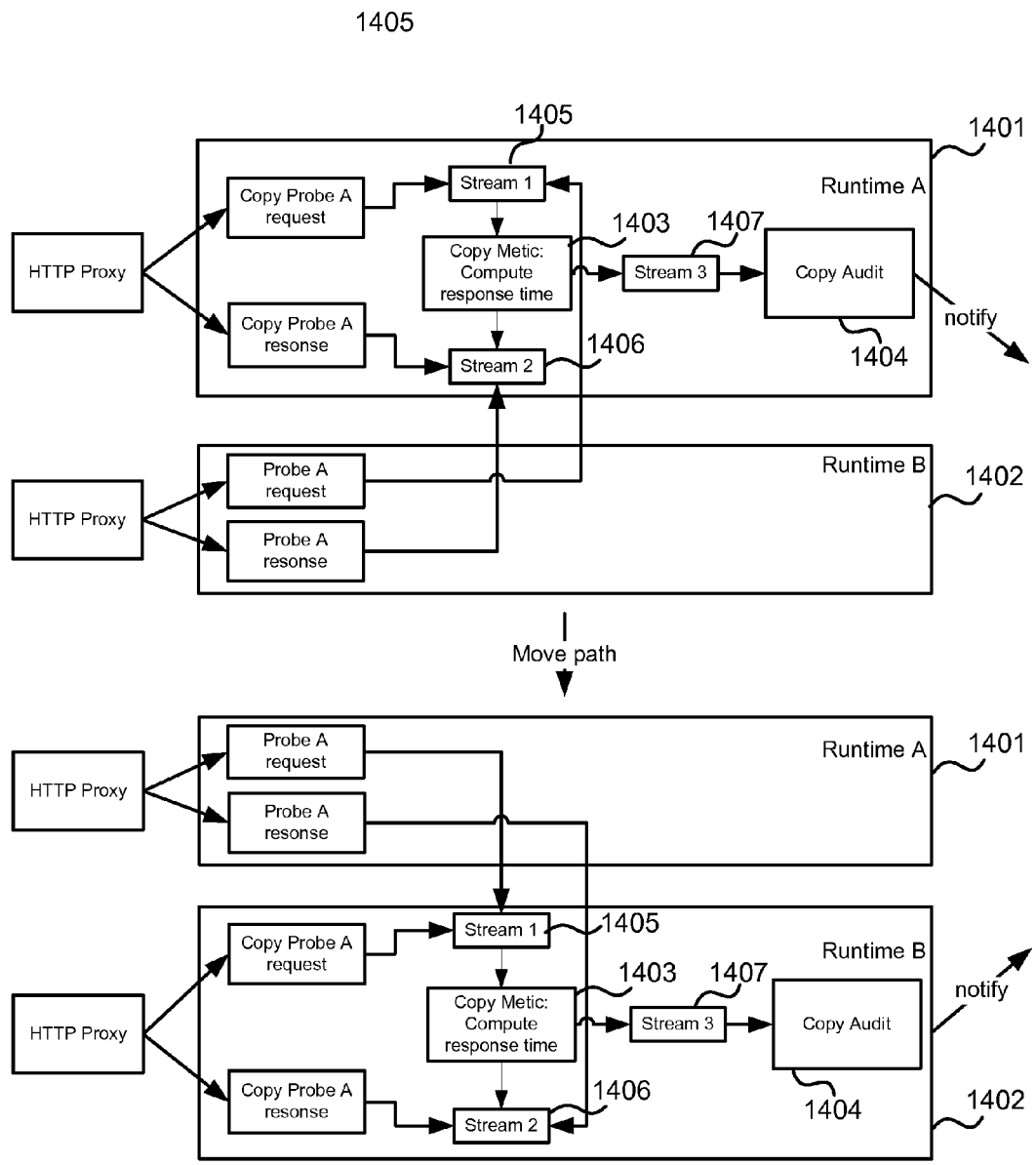
FIG. 14 shows a schematic diagram of the arrangement of elements in two runtimes both before and after moving a path.

A path comprises a combination of streams and elements and moving a path therefore involves moving the entire processing chain. A path movement can be implemented in two ways: as a combination of single moving steps per element or as by setting up the new path, rewiring the inputs to that path and then removing all of the elements from the old path and both these techniques use combinations of the methods described above. FIG. 14 shows a schematic diagram of the arrangement of elements in two runtimes 1401, 1402 both before and after moving a path. In the example shown in FIG. 14, a path comprising a metric 1403, an audit 1404 and a number of streams 1405-1407 is moved.

A metric is a stack of one or more functions and in the examples shown in FIGS. 3, 5, 7, 11, 13 and 14 described above the metric comprises the single function 'Compute response time'. A metric may be optimized by joining two sequential metrics into one metric or by splitting a single metric into two sequential metrics. Joining two sequential metrics may enable optimization of the data which is otherwise sent through streams between the two metrics. Splitting a metric into two sequential metrics enables the CPU load, memory consumption, and data exchanged on the wire to be shared between the two metrics. This may be particularly beneficial where a metric comprises a number of computationally intensive functions such that the work can be balanced between a number of different runtimes running on different machines.

In an example, a probe located on a web server sends data each time a request reaches the web server and the number of requests may be very high. If the system is only interested in requests coming from a specific application, the metric (which may be on a dedicated machine) filters the requests from the specific application and then counts the number of hits for that application per hour. In such an example, there will be a lot of traffic between the probe (web server) and the metric (dedicated machine). The arrangement may be optimized by splitting the metric and putting the filter part close to the probe, such that the communication between the web server and the dedicated machine will be less because only relevant data will flow.

Figure 15:
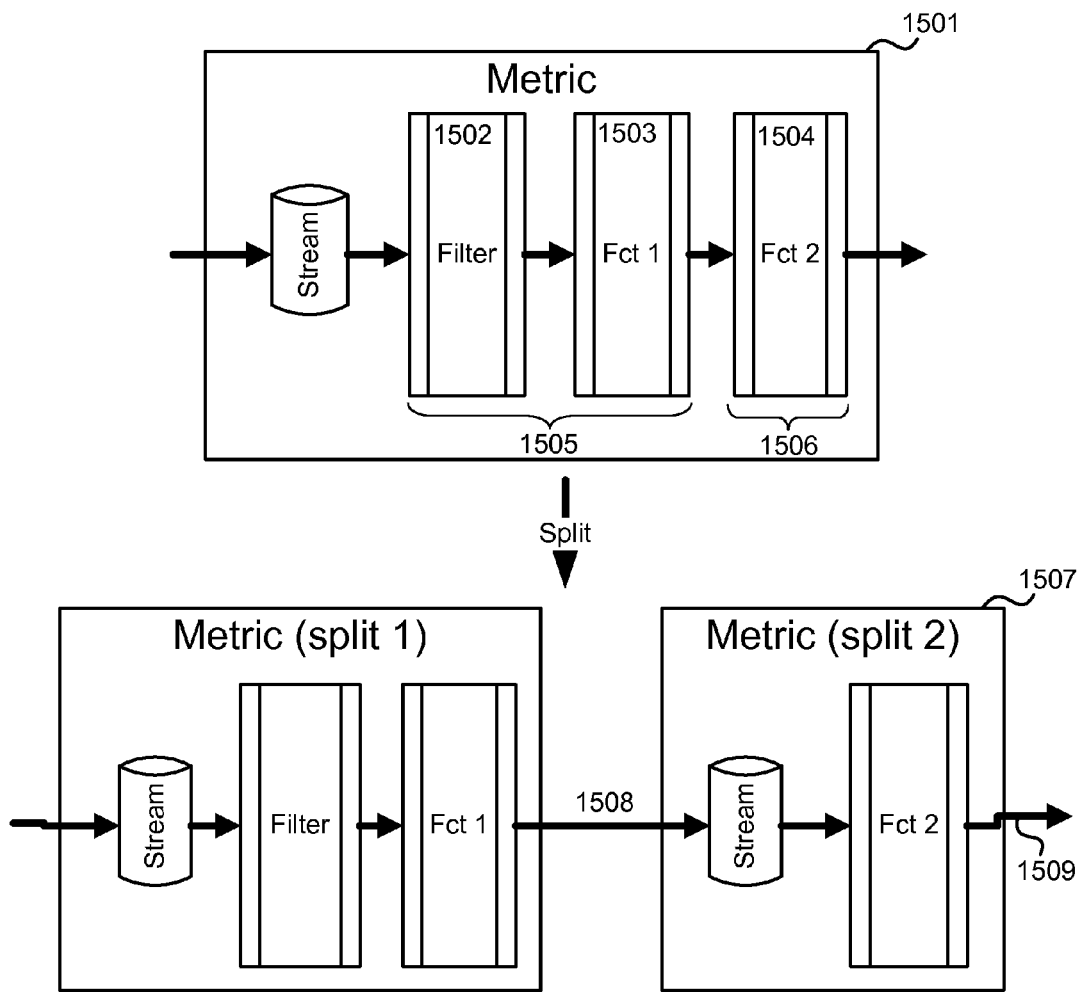
FIG. 15 shows a schematic diagram depicting splitting a metric.
Figure 16:
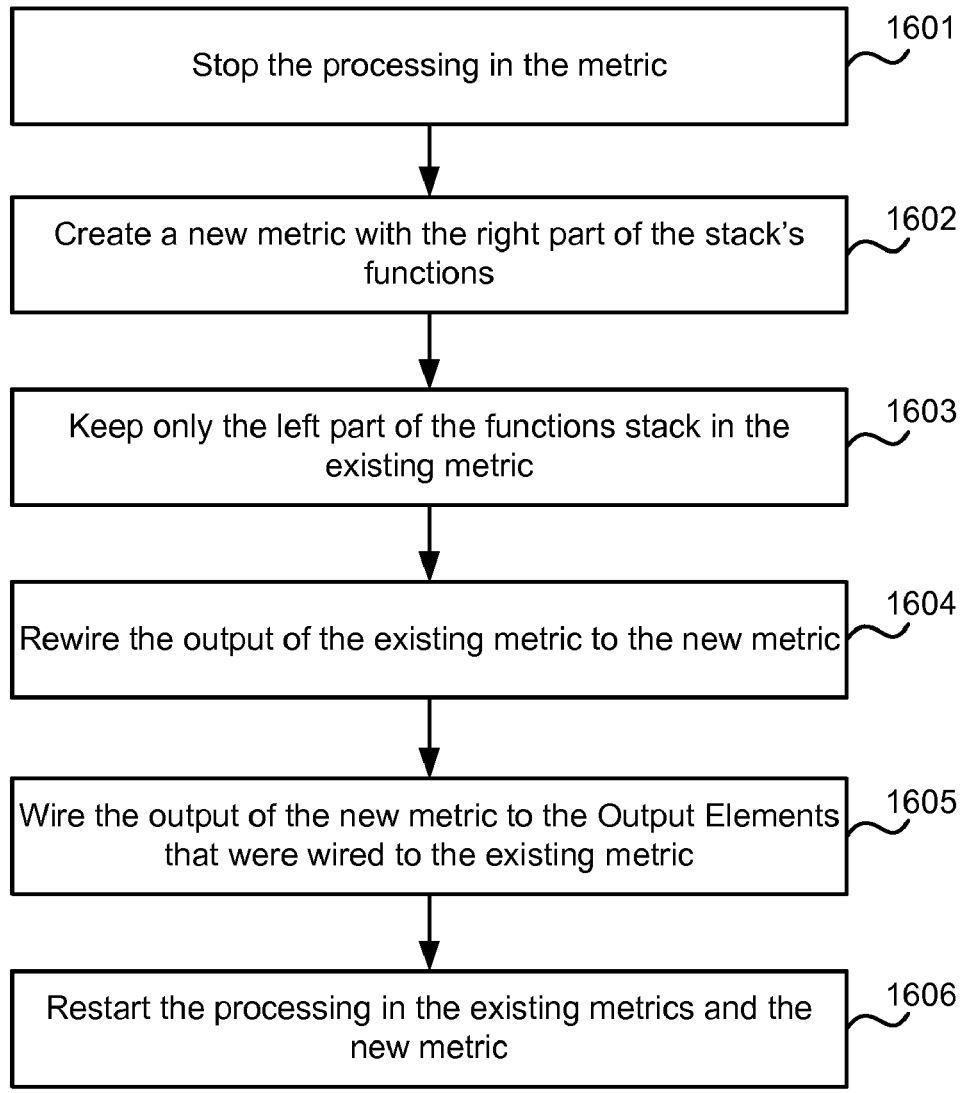
FIG. 16 shows a flow diagram of an example method of splitting a metric.

FIG. 15 shows a schematic diagram of splitting a metric and this can be described with reference to FIG. 1 6 which shows a flow diagram of an example method of splitting a metric. As described above, a metric 1501 is a stack of functions 1502-1504. These functions do not share memory and process data in sequence (e.g. function 1502→function 1503→function 1504). A metric split consists of dividing the stack of functions has to be kept identical. In the example shown, the stack is divided in a left part 1505 (functions 1501-1502) and a right part 1506 (function 1503) and the right part 1506 will moved to a new metric 1507. To split a metric the processing in the metric is stopped (block 1601) and a new metric 1507 is created with the right part 1506 of the stack's functions (function 1602). Only the left part 1 505 of the functions stack is kept in the existing metric 1501 (block 1603). The output of the existing metric 1501 is connected to the new metric 1507 (block 1604, arrow 1508) and the output of the new metric (arrow 1509) is connected to the output elements that were wired to the existing metric 1501 (block 1605). The processing in the existing metric 1501 and the new metric 1507 is then started (block 1606).

Having split a metric (e.g. as described above), one of the resultant metrics (e.g. 1501, 1507) may be moved. In the example described above in which a web server sends data each time a request is received and the SLA monitoring system is only interested in requests coming from a specific application, a metric comprising a filter function and a counter function may be split into two metrics. The metric comprising the filter function may then be moved onto the web server from the machine (which may be a dedicated machine) on which the metric comprising the counter function is running.

Figure 17:
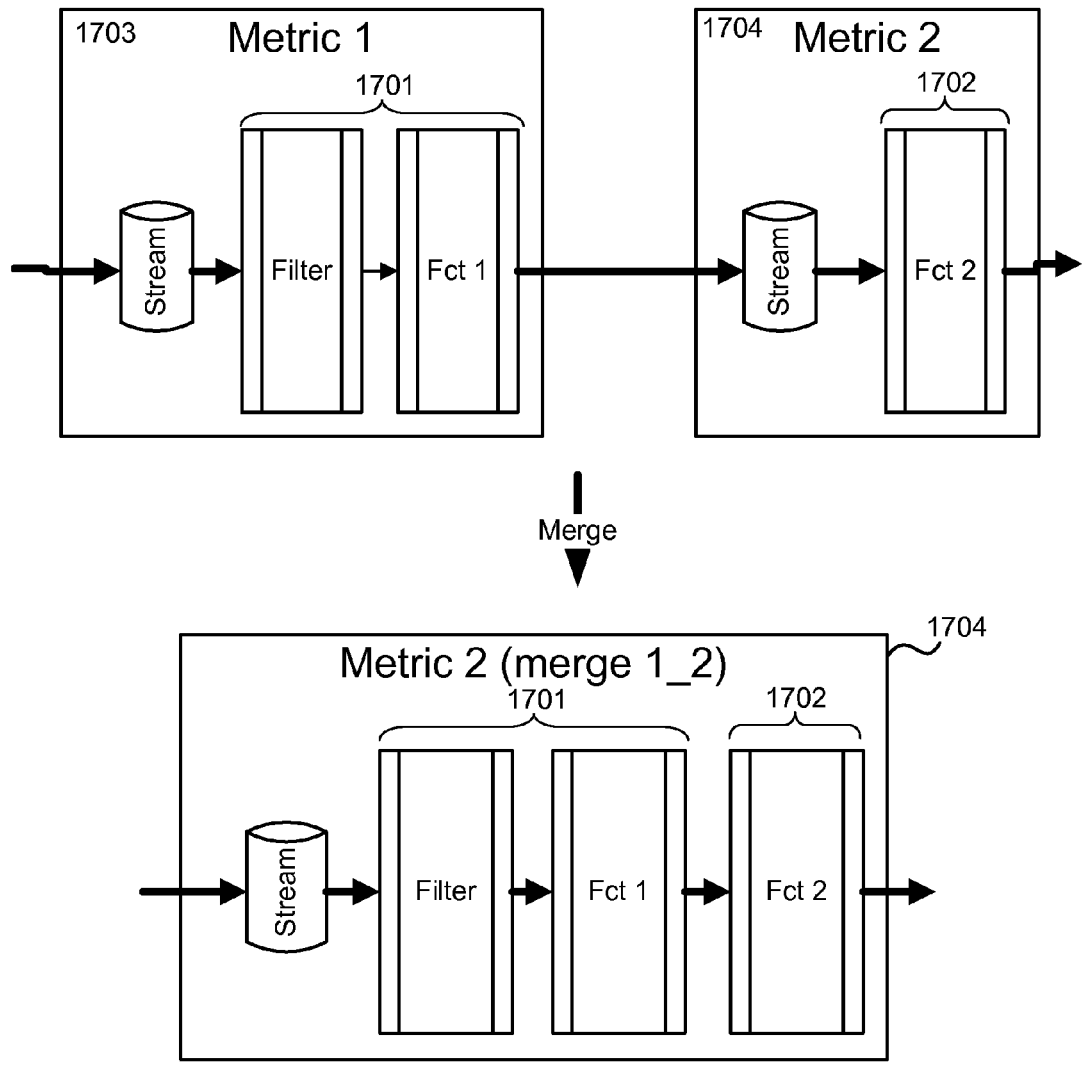
FIG. 17 shows a schematic diagram depicting joining two metrics.
Figure 18:
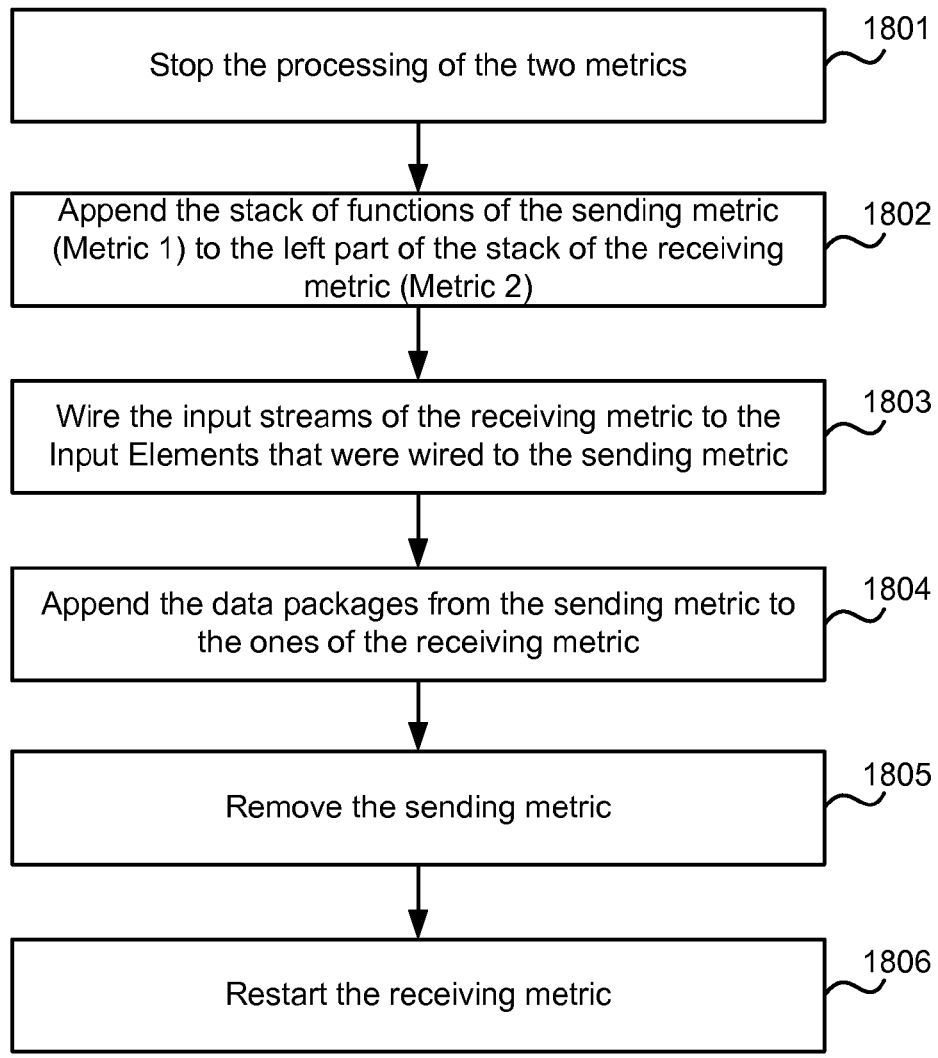
FIG. 18 shows a flow diagram of an example method of joining two metrics.

FIG. 17 shows a schematic diagram of joining two sequential metrics and this can be described with reference to FIG. 18 which shows a flow diagram of an example method of joining two sequential metrics. In order for two metrics to be joined, they must be sequential and based on the same triggering method. The join consists in uniting the two stacks of functions 1701, 1702 of the two metrics 1703, 1704. The first metric 1703 may be referred to as the sending metric and the second metric 1704 may be referred to as the receiving metric. To join the two metrics the processing of the two metrics 1703, 1704 is stopped (block 1801). The stack of functions 1701 of the sending metric 1703 is added to the left part of the stack 1702 of the receiving metric 1704 (block 1802) and the input streams of the receiving metric are connected to the input elements that were wired to the sending metric (block 1803). The data packages from the sending metric are then appended to the ones of the receiving metric (block 1804). These data packages are subcomponents (e.g. chunks) of a stream and the appending occurs so that no data is lost. For example, when the metrics 1703, 1704 are merged, there may be data that was available for the receiving metric 1704 to process. Such data packages are appended so that after merging, the data can still be processed by the correct function (i.e. function 1702). Having appended any data packages (in block 1804) the sending metric is removed (block 1805) and the receiving metric is restarted (block 1806).

It will be appreciated that whilst FIGS. 15-18 show the division of a metric into two metrics and the joining of two metrics into a single metric, in other examples the methods described above may be used to divide a metric into more than two metrics and/or to join more than two metrics into a single metric. Furthermore combinations of the techniques may be used to create new sequences of metrics which divide/combine stacks of functions in any manner, whilst maintaining the sequence of functions.

The primitive actions described above allow the SLA processing to be adjusted at runtime to manage or re-distribute load of a runtime or to incorporate new data sources as they appear. With this set of actions, the following dynamic actions can, for example, be supported:

SLA optimization at load time:
  The information about the communication cost and the function cost allows the load optimizer to move the elements closed to the data extraction and predict if the runtime will be capable of handling the load.
Processing optimization for probe updates:
  If an SLA gets an a new probe copy assigned, the runtime can move parts of the computation with it, to optimize the data packages that are send over the wire
Automated SLA runtime load balancing to ensure fast processing:
  If a runtime gets to the point that it is fully loaded, it can assess the different SLAs and move one of them to a runtime that is not that fully loaded.

Figure 19:
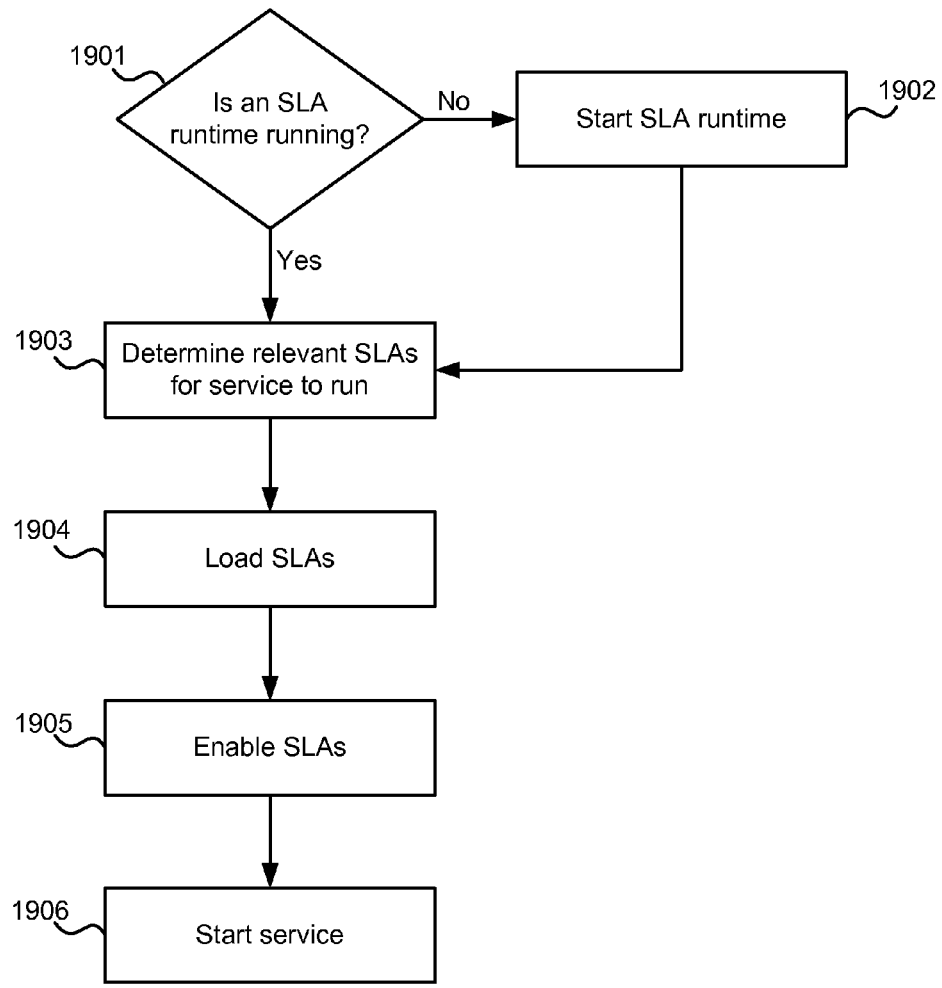
FIG. 19 is a flow diagram of an example automatic start-up method for a SLA monitoring infrastructure.
Figure 19:
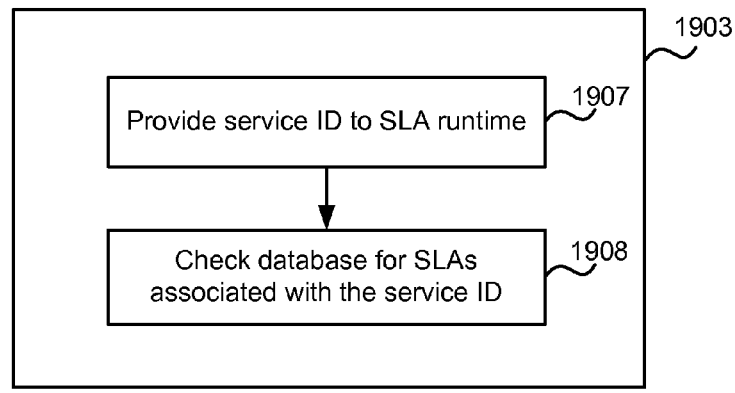

Depending on the kind of service covered by an SLA, some services are more dynamic than others. The SLA monitoring of a service needs to be aware of any change to the service deployment, such as a new instantiation of a service or its redeployments. FIG. 19 is a flow diagram of an example automatic start-up method for a SLA monitoring infrastructure, such as the SLA monitoring infrastructure described above. Before a monitored service can start its processing, the SLA runtime needs to be started and all SLAs for this service have to be loaded and enabled. The method comprises checking if an SLA runtime is running (block 1901). This runtime may be local (e.g. running on the machine providing the particular monitored service) or remote (e.g. running elsewhere) provided that the data needed to compute the SLA can be extracted. If there is no SLA running ('No' in block 1901), an SLA runtime is started (block 1902). All relevant SLAs for the service to run are identified (block 1903), loaded (block 1904) and enabled (block 1905) before startup of the service (block 1906). The enabling of the relevant SLAs (in block 1905) comprises the internal configuration of the runtime, e.g. through creation of suitable elements (probes/metrics/audits) and streams using the primitive actions described above. The method shown in FIG. 19 couples the service startup with the SLA runtime startup and the loading of the required SLAs which means that the service does not start ahead of the SLA monitoring and therefore data is not lost.

The method shown in FIG. 19 is performed by a wrapper around the service and which is executed by the service manager. This wrapper discovers the association between the service and the SLAs which are required. As shown in FIG. 19, the wrapper starts the SLA runtime first (in block 1902)

and when it is ready, starts the service (in block 1906). In addition, the service is linked with its SLAs (as described in more detail below) so that the corresponding SLAs can be loaded into the runtime (in block 1904).

FIG. 19 also shows an example implementation of one of the method blocks in more detail. In order to determine the relevant SLAs (in block 1903), the SLA runtime may be provided with service information, such as an identifier for the service (block 1907) which is referred to herein as a service ID. This service ID (or other service information) can then be used by the SLA runtime to query a database to find the SLAs that correspond to the service (block 1908). In an example implementation, the service ID may comprise a unique identifier which may, for example, be fully qualified class names and path information hashed to one identifier. The same information (e.g. the service ID) may be generated when the SLAs are created. The service ID may be stored with the SLAs (e.g. in a database) and can therefore be used (in block 1908) to retrieve the SLAs on the startup of the SLA runtime.

If a service gets extended by one additional instance, the required SLAs are already loaded and monitored in at least one other runtime. In this scenario, there is no need to deploy the entire SLA again (e.g. using the method shown in FIG. 19), but instead the existing monitoring may be extended with new probes (e.g. as described above with reference to FIGS. 2 and 3).

If a machine hosts multiple services when a new service (or a new instantiation of an existing service) is started on the machine, the SLA monitoring is already running ('Yes' in block 1901). However, the SLAs for this specific service are missing. The check for a running SLA runtime on the machine (in block 1901) may be performed by checking a run-lock file or trying to connect to the SLA runtime at its port.

Figure 20:
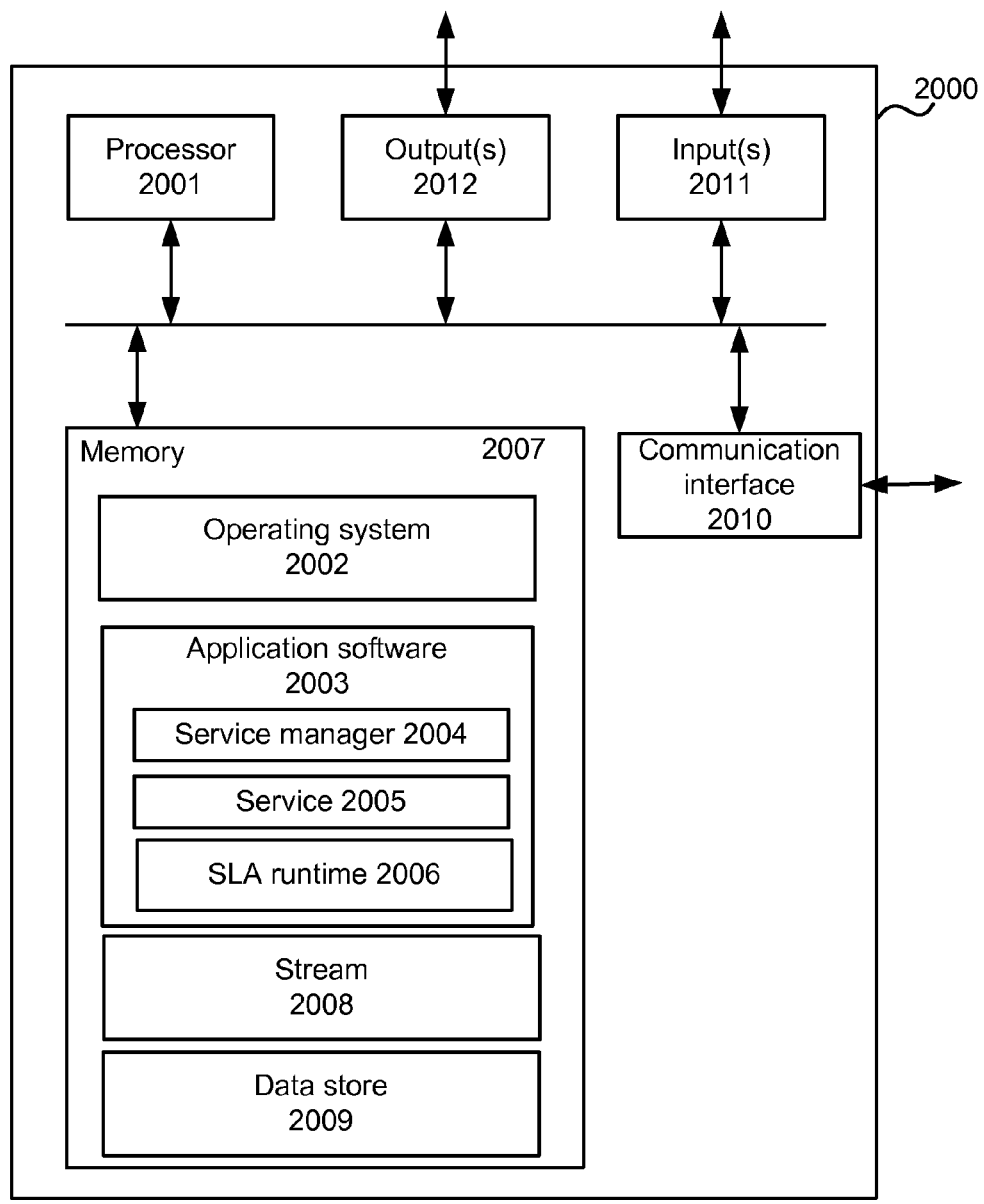
FIG. 20 illustrates an exemplary computing-based device in which embodiments of the methods described herein may be implemented.

FIG. 20 illustrates various components of an exemplary computing-based device 2000 which may be implemented as any form of a computing and/or electronic device, and in which embodiments of the methods described herein may be implemented.

Computing-based device 2000 comprises one or more processors 2001 which may be microprocessors, controllers or any other suitable type of processors for processing computing executable instructions to control the operation of the device in order to implement any aspects of the dynamic SLA infrastructure described herein. Platform software comprising an operating system 2002 or any other suitable platform software may be provided at the computing-based device to enable application software 2003 to be executed on the device. The application software 2003 may comprise a service manager 2004, one or more services 2005, one or more SLA runtimes 2006 etc.

The computer executable instructions may be provided using any computer-readable media, such as memory 2007. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory 2007 may also be arranged to store one or more streams 2008 and a database 2009 of SLAs and service IDs. Alternatively, the streams and/or the database may be stored remotely and accessed via a communication interface 2010.

The computing-based device 2000 may further comprise one or more inputs 2011 and one or more outputs 2012. An input 2011 may, for example, comprise an input of any suitable type for receiving media content, Internet Protocol (IP) input, etc. An output 2012 may comprise an audio and/or video output to a display system integral with or in communication with the computing-based device. The display system may provide a graphical user interface, or other user interface of any suitable type.

Although the present examples are described and illustrated herein as being implemented in a distributed system, the system described is provided as an example and not a limitation. As those skilled in the art will appreciate, the present examples are suitable for application in a variety of different types of systems.

A single machine (such as that shown in FIG. 20) may host one or more SLA runtimes and may monitor one or more services. A single runtime may monitor one SLA or multiple SLAs or multiple SLAs may collaborate to monitor a single SLA.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A system for monitoring a service comprising:
a processor capable of executing computer-executable instructions;
a memory for storing computer executable instructions;
a probe arranged to extract data relating to performance of the service;
a metric arranged to aggregate and transform data received from the probe;
an audit element arranged to validate data received from the metric against defined criteria;
a plurality of streams, wherein each stream is arranged to store data for processing and to transport data between two elements, each of the two elements comprising one of the probe, the metric and the audit element; and
a service manager stored in the memory and executable on the processor to start a service level agreement runtime prior to starting a new instance of the service, the service manager including instructions for performing the operations comprising:
determining if the service level agreement runtime is running;
starting, if the service level agreement runtime is not running, the service level agreement runtime;
determining any service level agreements relating to said service;
loading said service level agreements;
enabling said service level agreements; and
starting said new instance of the service.

2. The system according to claim 1, the memory further including instructions for performing a set of methods for manipulating an element, the element comprising one of the probe, the metric and the audit element, and the set of methods comprising:
duplicating an element;
removing an element; and
splitting the metric; and
joining two metrics.

3. The system according to claim 2, wherein the method for duplicating a probe comprises:
creating a duplicate of said probe;
connecting a stream between said duplicate of said probe and any output elements of said probe; and
triggering said duplicate of said probe to start extracting data relating to performance of the service.

4. The system according to claim 2, wherein the method for duplicating a metric comprises:
creating a new instance of said metric;
connecting a stream between said new instance of said metric any output elements of said metric;
stopping any input elements to said metric;
connecting a stream between at least one of said input elements and said new instance of said metric;
disconnecting a stream between said at least one of said input elements and said metric;
starting said input elements; and
starting the new instance of said metric.

5. The system according to claim 2, wherein the method for duplicating an audit element comprises:
creating a duplicate of said audit element;
stopping any input elements to said audit element;
connecting a stream between at least one of said input elements and said duplicate of said audit element; and
starting said input elements.

6. The system according to claim 2, wherein the method for removing a probe comprises:
disconnecting any output streams from said probe; and
removing said probe.

7. The system according to claim 2, wherein the method for removing a metric comprises:
stopping each input element to said metric;
connecting a stream between each input element and an existing copy of said metric;
disconnecting streams between each input element and said metric;
starting each input element;
disconnecting streams between said metric and any output elements; and
removing said metric.

8. The system according to claim 2, wherein the method for removing an audit element comprises:
stopping each input element to said audit element;
disconnecting streams between each input element and said audit element;
connecting a stream between each input element and an existing copy of said audit element;
starting each input element; and
removing said audit element.

9. The system according to claim 2, wherein a metric comprises a stack of functions arranged in a sequence and the method of splitting a metric comprises:
stopping said metric;
creating a new metric comprising a subset of said stack of functions;
removing said subset of said stack of functions from said metric;
connecting an output of said metric to said new metric;
connecting a stream between the new metric and any output elements of said metric; and
starting said metric and said new metric,
and wherein the sequence of functions is unchanged.

10. The system according to claim 2, wherein each metric comprises a stack of functions the method of joining two metrics comprises:
stopping a first metric and a second metric, wherein an output of the first metric is connected to an input of the second metric;
inserting the stack of functions from the first metric into the stack of functions from the second metric before a first function in said stack of functions from the second metric;
connecting any input elements of the first metric to the second metric;
removing the first metric; and
starting the second metric.

11. The system according to claim 1, wherein determining any service level agreements relating to said service comprises:

provide a service identifier; and accessing a database to identify any service level agreements associated with said service identifier.

12. One or more executable instructions stored on a memory and executable on a processor to implement a method of providing a new instance of a service comprising:

determining if a service level agreement runtime is running on a machine providing said new instance of a service;

starting, if the service level agreement runtime is not running, the service level agreement runtime;

determining any service level agreements relating to said service;

loading said service level agreements;

enabling said service level agreements, the enabling including generating elements within the service level agreement runtime to extract data relating to the service, manipulate the data and validate the data against defined criteria, elements comprise at least one of:

a probe for extracting data relating to the service;

a metric for manipulating data received from the probe or the metric;

an audit element for validating data against defined criteria; and a stream for storing data generated by an element and for transporting data between elements; and starting said new instance of the service.

13. A method according to claim 12, wherein said step of generating elements comprises at least one of:

duplicating an element; and removing an element.

14. An infrastructure for monitoring a service level agreement comprising:

a processor capable of executing computer-executable instructions;

a memory for storing computer executable instructions;

a probe component, stored on the memory and executable on the processor, for extracting data relating to a service provided under the service level agreement;

a metric component, stored in the memory and executable on the processor, comprising at least one function for manipulating data received from the probe component;

an audit component, stored in the memory and executable on the processor, for validating data received from the metric component against performance criteria specified in the service level agreement;

a stream arranged to store data output by a probe component for manipulation by the metric component;

a stream arranged to store data output by the metric component for validation by the audit component; and a service manager, stored in the memory and executable on the processor, arranged to create a runtime for monitoring a service prior to starting a new instance of a service, the service manager including instructions for performing the operations comprising:

determining if a service level agreement runtime is running;

starting, if the service level agreement runtime is not running, the service level agreement runtime;

determining any service level agreements relating to said service;

loading said service level agreements;

enabling said service level agreements; and starting said new instance of the service.

15. An infrastructure according to claim 14, further comprising a set of basic operations for adapting the infrastructure, the set of basic operations comprising:

duplicating one of a probe component, a metric component and an audit component;

removing one of a probe component, a metric component and an audit component;

dividing a metric component; and joining a plurality of sequential metric components.

* * * * *